United States Patent [19]

Yoshimura

[11] Patent Number: 5,701,251

[45] Date of Patent: Dec. 23, 1997

[54] METHOD AND SYSTEM FOR CONSTRUCTING THE FIGURES OF BLANKS IN SHEET METAL WORK

[75] Inventor: Yukio Yoshimura, Ishikawa, Japan

[73] Assignee: Kabushiki Kaisha Komatsu Seisakusho, Tokyo, Japan

[21] Appl. No.: 564,283

[22] PCT Filed: Jun. 24, 1994

[86] PCT No.: PCT/JP94/01026

§ 371 Date: Dec. 29, 1995

§ 102(e) Date: Dec. 29, 1995

[87] PCT Pub. No.: WO95/04315

PCT Pub. Date: Feb. 9, 1995

[30] Foreign Application Priority Data

Jul. 30, 1993 [JP] Japan .................. 5-190508

[51] Int. Cl.⁶ .................. G06F 17/50; G06F 19/00
[52] U.S. Cl. .................. 364/474.24; 364/474.13; 364/474.29; 364/468.01; 364/468.24; 364/469.01; 364/474.09; 83/13; 83/39; 83/40; 83/55; 83/75.5; 83/49; 395/118; 395/141; 395/142; 395/143
[58] Field of Search .......... 364/474.24, 474.25–474.26, 364/468.01, 468.24, 469.01, 474.01, 474.08, 474.13, 474.16, 474.28, 474.29, 474.09; 83/13, 34–35, 39–40, 49, 52, 55–56, 75.5, 797, 798; 395/118, 133–135, 141–143

[56] References Cited

U.S. PATENT DOCUMENTS

| | | | |
|---|---|---|---|
| 3,596,068 | 7/1971 | Doyle | 364/470.06 |
| 3,803,960 | 4/1974 | Pearl et al. | 83/56 |
| 3,864,997 | 2/1975 | Pearl et al. | 83/49 |
| 4,469,930 | 9/1984 | Takahashi | 219/121.72 |
| 4,706,201 | 11/1987 | Kish et al. | 364/474.29 |
| 5,042,339 | 8/1991 | Gerber | 83/49 |
| 5,134,911 | 8/1992 | Busky et al. | 83/34 |
| 5,214,590 | 5/1993 | Schnetzer | 364/474.13 |
| 5,231,697 | 7/1993 | Yamada | 395/142 |
| 5,359,872 | 11/1994 | Nashiki | 72/16.1 |

FOREIGN PATENT DOCUMENTS

| | | |
|---|---|---|
| 62-69301 | 3/1987 | Japan . |
| 5-19831 | 1/1993 | Japan . |
| 5-61999 | 3/1993 | Japan . |

*Primary Examiner*—Emanual T. Voeltz
*Assistant Examiner*—Tuan Q. Dam
*Attorney, Agent, or Firm*—Nikaido, Marmelstein, Murray & Oram LLP

[57] ABSTRACT

A blank-figure constructing method for sheet metal work, wherein a cutting passage planned to sequentially cut a plurality of desired blanks from a sheet material is determined, utilizing a multiple figure composed of the figures of the plurality of blanks to be obtained, in the multiple figure of which the adjacent line segments of the single blank figures are combined. This method is that if the multiple figure has an even number of, four or more odd vertices at each of which an odd number of internal and external line segments of the multiple figure meet, an auxiliary line is drawn outside the multiple figure, connecting any two of the odd vertices on the outline of the multiple figure to make the total number of odd vertices be two or zero so that the cutting passage, which passes through all the internal, external line segments and auxiliary line of the multiple figure, can be determined.

10 Claims, 5 Drawing Sheets

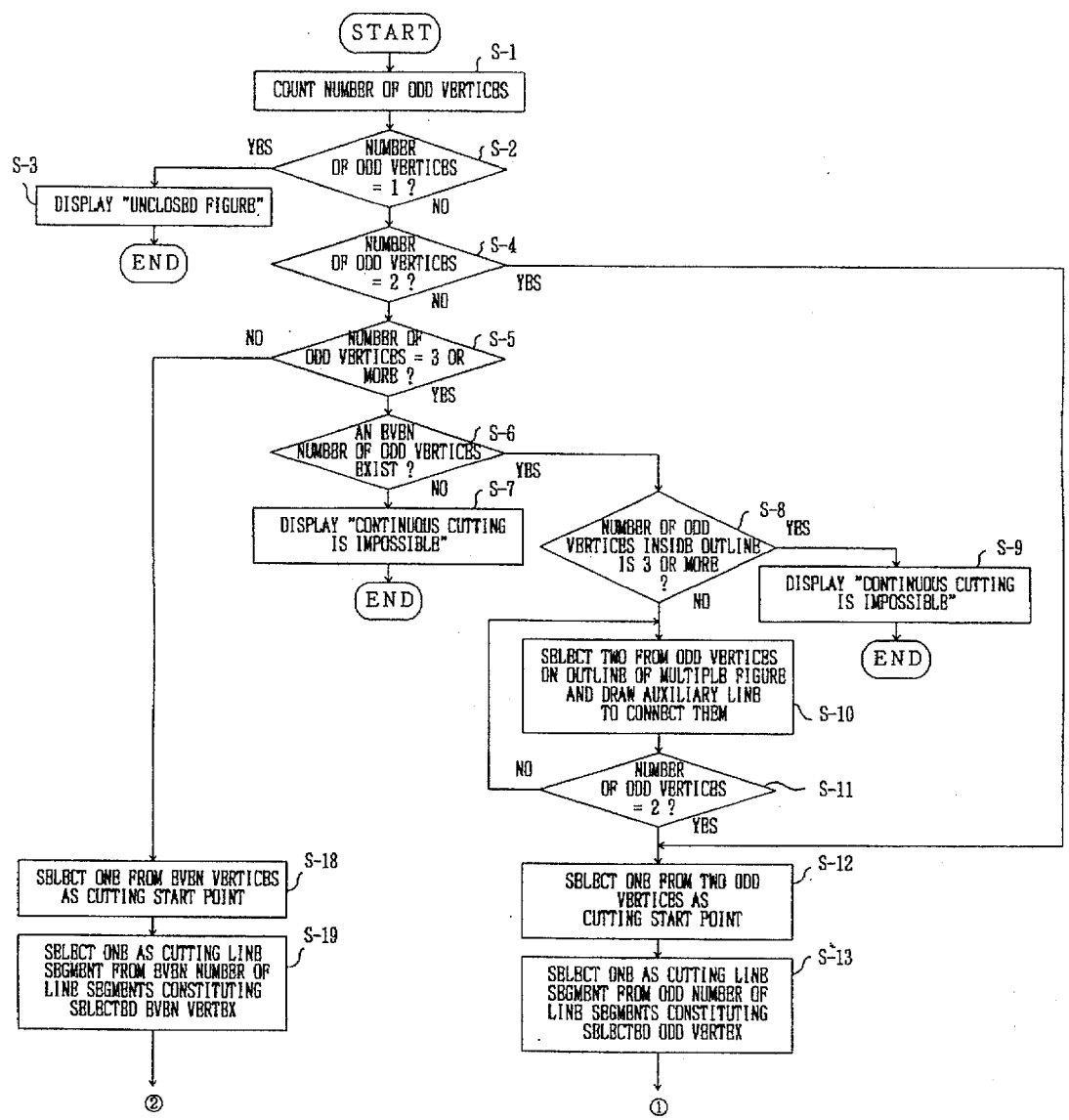
FIG. 2/1

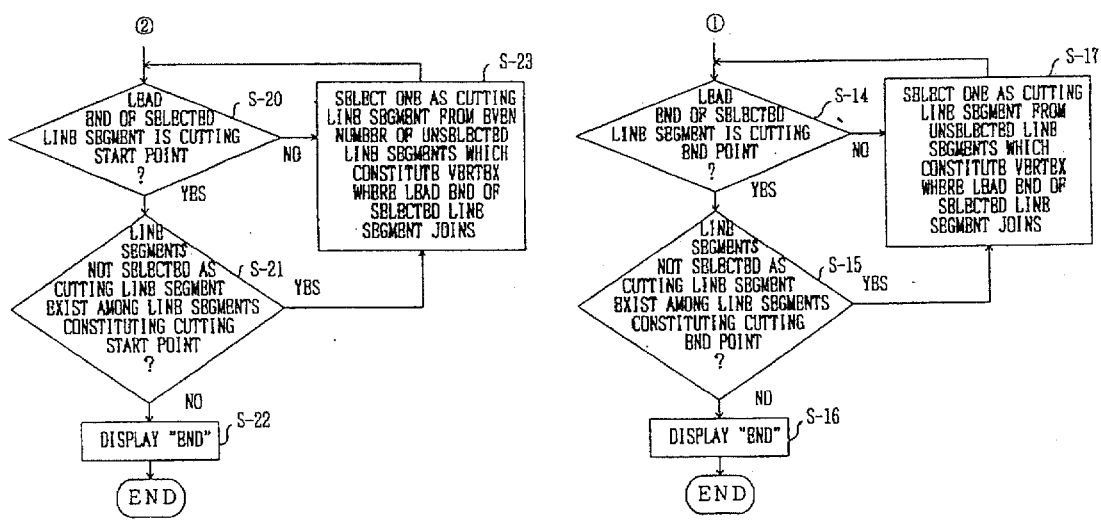
FIG. 2/2

METHOD AND SYSTEM FOR CONSTRUCTING THE FIGURES OF BLANKS IN SHEET METAL WORK

1. Technical Field

The present invention relates to a blank-figure constructing method and system for sheet metal work and, more particularly, to a blank-figure constructing method and system which are adapted in use for sheet metal work to determine the positions of blanks on a sheet material to cut therefrom and to determine a passage for cutting the blanks.

2. Background Art

Japanese Patent Publication Laid-Open No. 5-19831 (1993) discloses a prior art blank-figure constructing method and system for use in sheet metal work. According to this publication, a multiple figure, which is composed of a plurality of figures corresponding to a plurality of desired metal blanks to be cut from a sheet material, is constructed on the sheet material such that the adjacent line segments of the figures corresponding to the blanks are combined as shown, for instance, in FIG. 3. When sequentially cutting the plurality of blanks from the sheet material, the cutting passage is determined such that priority is given to the longer line segment and further to a line segment closer to the presently cutting position.

In the above method and system, since a cutting passage is determined by simply giving precedence to a longer or nearer line segment, it is impossible to find a cutting passage which passes through all the internal and external line segments of the multiple figure in cases where the multiple figure has four vertices at each of which an odd number of internal and external line segments meet as shown, for instance, in FIG. 3 (this vertex is hereinafter referred to as "odd vertex"). In such cases, cutting cannot be continuously performed and therefore the initial operation of cutting (i.e., piercing etc.) has to be performed more than once, which limits the speed of the cutting operation.

The invention has been made in consideration of the foregoing problem and one of the objects of the invention is therefore to provide a blank-figure constructing method and system for sheet metal work, which enables continuous, high-speed cutting.

DISCLOSURE OF THE INVENTION

The above object can be achieved by a blank-figure constructing method for sheet metal work according to the invention, wherein a cutting passage planned to sequentially cut a plurality of desired blanks from a sheet material is determined, utilizing a multiple figure composed of the figures of the plurality of blanks to be obtained, in the multiple figure of which the adjacent line segments of the single blank figures are combined, if the multiple figure has an even number of, four or more odd vertices at each of which an odd number of internal and external line segments of the multiple figure meet, an auxiliary line is drawn outside the multiple figure, connecting any two of the odd vertices on the outline of the multiple figure to make the total number of odd vertices be two or zero so that the cutting passage, which passes through all the internal, external line segments and auxiliary line of the multiple figure, can be determined.

The above object can be also achieved by a blank-figure constructing system for sheet metal work according to the invention, wherein a cutting passage planned to sequentially cut a plurality of desired blanks from a sheet material is determined, utilizing a multiple figure composed of the figures of the plurality of blanks to be obtained, in the multiple figure of which the adjacent line segments of the single blank figures are combined, comprising auxiliary line drawing means for drawing an auxiliary line outside the multiple figure, if the multiple figure has an even number of, four or more odd vertices at each of which an odd number of internal and external line segments of the multiple figure meet, to connect any two of the odd vertices on the outline of the multiple figure so that the total number of odd vertices becomes two or zero, wherein the cutting passage, which passes through all the internal, external line segments and auxiliary line of the multiple figure, is determined.

First of all, it should be noted that the cutting passage that passes through all the internal and external line segments of the multiple figure can be obtained only when one of the following conditions are met.

1. Where the cutting start point and the cutting end point differ from each other, each point is an odd vertex at which an odd number of line segments meet.
2. Where the cutting start point and the cutting end point are the same, this point is a vertex at which an even number of line segments meet (this vertex is hereinafter referred to as "even vertex").
3. Each of vertices other than the cutting start point and the cutting end point is an even vertex at which an even number of line segments meet.

Since the cutting passage that passes through all the line segments can be obtained under the above conditions, when the multiple figure has four odd vertices as in the example mentioned before, such a passage cannot be obtained and therefore continuous cutting is impossible. However, continuous cutting can be performed by the following arrangement. Taking FIG. 4 for example, of the four odd vertices (i.e., vertices a, b, c, f), two odd vertices (i.e., vertices b and c) on the outline of the multiple figure are linked by an auxiliary line t, whereby these odd vertices b and c respectively become an even vertex and, as a result, the total number of odd vertices in the multiple figure becomes two.

Accordingly, in cases where the multiple figure has an even number of, four or more odd vertices, an auxiliary line is drawn outside the multiple figure so as to connect the vertices on the outline of the multiple figure among these odd vertices, whereby a cutting passage that passes through all the internal, external line segments and auxiliary line can be determined to perform continuous cutting in the order indicated by arrows in FIG. 4.

The above-described construction of blank figures for sheet metal work is preferably performed with a computer-aided design system (CAD) or computer-aided manufacturing system (CAM) and the auxiliary line may be angled and/or curved.

The sheet material may be a steel plate, non-ferrous sheet material such as Al and Ti, or non-metal sheet material such as ceramics and plastics. Cutting performed in the invention is preferably gas cutting, arc cutting, electron beam cutting, laser cutting or water jet cutting. The internal and external line segments may be straight or curved.

Other objects of the present invention will become apparent from the detailed description given hereinafter. However, it should be understood that the detailed description and specific example, while indicating preferred embodiment of the invention, are given by way of illustration only, since various changes and modifications within the spirit and scope of the invention will become apparent to those skilled in the art from this detailed description.

BRIEF DESCRIPTION OF THE DRAWINGS

FIGS. 1 to 5 are associated with a preferred embodiment of a blank-figure constructing method and system for sheet metal work according to the invention.

FIG. 1 is a schematic diagram of a metal sheet cutting system including a console-type computer.

FIGS. 2/1 and 2/2 are flow charts of the fundamental process of a CAD/CAM program.

FIG. 3 is a diagrammatic view of a multiple figure.

FIG. 4 is an explanatory diagram showing a cutting passage in the multiple figure.

FIG. 5 is a schematic diagram showing a cutting passage in another multiple figure corresponding to FIG. 4.

BEST MODE FOR CARRYING OUT THE INVENTION

Figure 1:
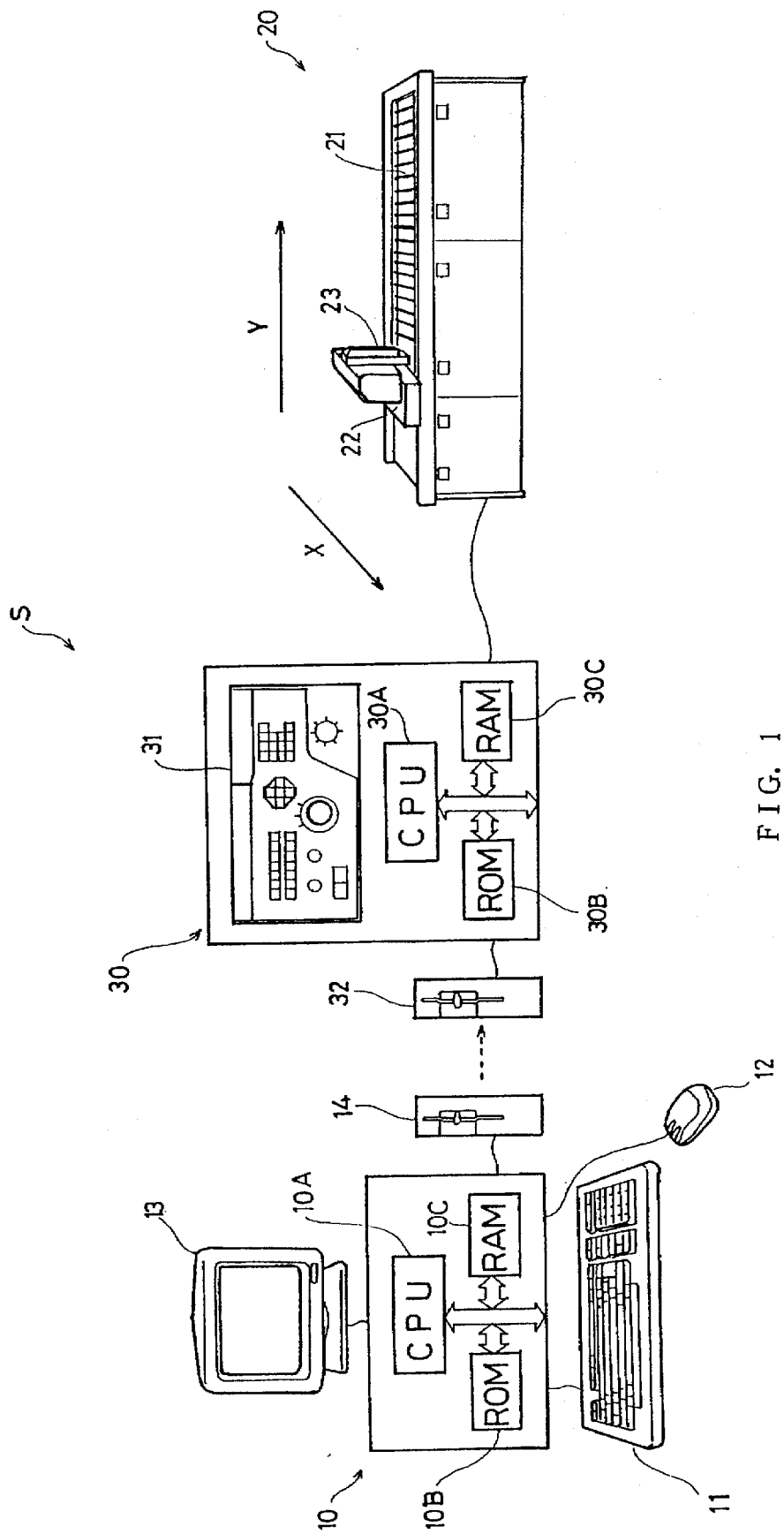

Referring now to the drawings, a blank-figure constructing method and system for sheet metal work will be described according to an embodiment of the invention.

FIG. 1 schematically illustrates a metal sheet cutting system S that comprises (i) a console-type computer 10 incorporating a computer-aided design system (CAD) and computer-aided manufacturing system (CAM) to which a blank-figure constructing system according to the invention is applied; (ii) a laser cutter 20 for cutting a sheet material with laser beams; and (iii) a numerical control unit 30 for automatically controlling the operation of the laser cutter 20. The console-type computer 10 comprises (i) a central processing unit (CPU) 10A for executing the program for the CAD/CAM; (ii) a read only memory (ROM) 10B for storing this program; and (iii) a random access memory (RAM) 10C that serves as a working memory including various registers used in the arithmetic operations necessary for executing the program. Connected to the computer 10 are a key board 11 and a mouse 12 which serve as input devices. Also, a display unit 13 and a floppy disk drive 14 are connected to the computer 10 as output devices. According to the data input through the key board 11 and mouse 12, arithmetic operations based on the aforesaid program are performed. While results yielded by the arithmetic operations are displayed on the display unit 13, they are finally written, as NC data for cutting, in a floppy disc inserted in the floppy disc drive 14. The laser cutter 20 comprises. (i) a work table 21 having a clamper (not shown) that holds down a sheet material along the direction of the X-axis (see FIG. 1) at the base end (i.e., the end of the laser cutter 20 when viewing the cutter 20 in the direction of the Y-axis in FIG. 1); (ii) a carriage 22 that is moved back and forth on the work table 21 in the direction of the Y-axis by means of a Y-axis driving motor (not shown); (iii) a laser head 23 that is moved back and forth along the carriage 22 in the direction of the X-axis by means of an X-axis driving motor (not shown). The numerical control unit 30 comprises (i) a central processing unit (CPU) 30A for executing an NC control program; (ii) a read only memory (ROM) 30B for storing this program; and (iii) a random access memory (RAM) 30C that serves as a working memory including various registers used in the arithmetic operations necessary for executing the program. The processing unit and memories used in the numerical control unit 30 are similar to those of the console-type computer 10 described earlier. Also, the numerical control unit 30 is provided with an operation panel 31 serving as an input device and connected to a floppy disc drive 32. In the system comprised of the above-described members, according to data input by the operation panel 31, the NC data is read from the floppy disc written in the console-type computer 10, inserted in the floppy disk drive 32. Based on the aforesaid program, various arithmetic operations are executed to drive the Y-axis and X-axis driving motors, so that the carriage 22 and the laser head 23 are driven and the sheet material placed on the work table 21 is cut into a desired shape. Note that the process for the execution of the NC control program is known and therefore will not be described herein.

Figure 3:
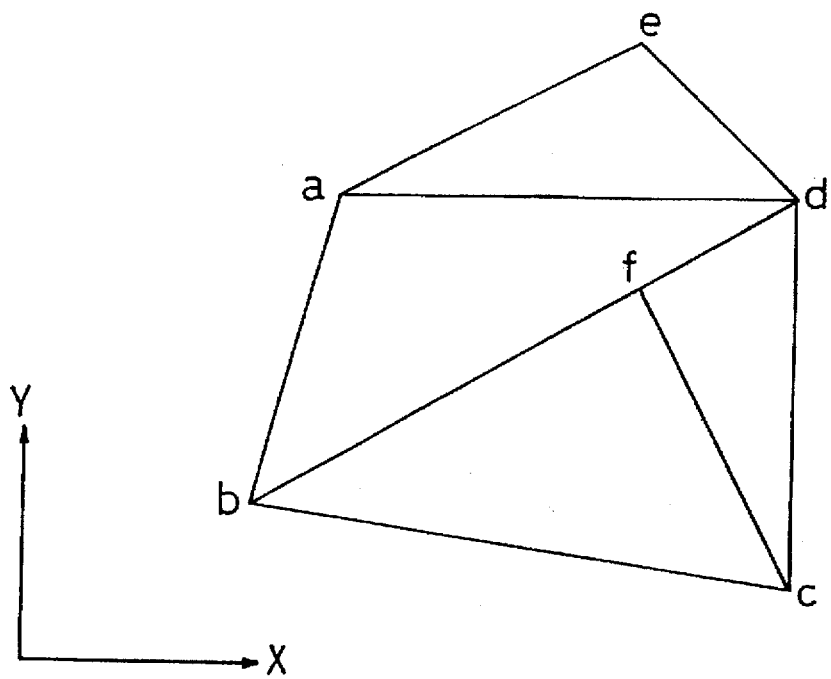

Now, reference will be made to the flow chart of FIG. 2 to describe the fundamental process of the program for the computer-aided design system CAD and computer-aided manufacturing system CAM. In this description, the figures of a plurality of blanks to be cut from a sheet material are input by the key board 11 and/or mouse 12 and combined into a multiple figure as shown in FIG. 3. For combining single blank figures, translation operation such as parallel operation or rotational operation is performed according to the operation of the key board 11 and/or mouse 12 with the method disclosed in Japanese Patent Publication Laid-Open No. 5-19831 (1993). In the multiple figure thus obtained, the adjacent line segments of the single figures are overlapped with each other.

S-1: The number of odd vertices, at each of which an odd number of internal and external line segments of the multiple figure meet, is calculated. The multiple figure shown in FIG. 3 has four odd vertices which are vertices a, b, c and f.

S-2, S-3: A check is made to judge whether the number of odd vertices in the multiple figure is 1. If so, it is then determined that not all of the external line segments in the multiple figure are linked to one another so that the figure is not entirely closed by lines. This does not satisfy the precondition of the multiple figure necessary for continuous cutting and therefore the display unit 13 indicates "the figure is not closed (unclosed figure)".

S-4, S-5: If it is determined in Step S-2 that the number of odd vertices in the multiple figure is not 1, then a check is made to judge whether the number of odd vertices is two. If the number is two, the program proceeds to Step S-12. If the number is not two, a check is then made to judge whether the number of odd vertices is three or more. If the number is not three or more, the program proceeds to Step S-18.

S-6, S-7: If it is determined in Step S-5 that the number of odd vertices is three or more, a check is then made to judge the number of odd vertices is an even number. If not, continuous cutting cannot be performed and therefore the display unit 13 indicates "continuous cutting is impossible".

S-8, S-9: If it is determined in Step S-6 that the multiple figure has an even number of odd vertices, a check is further made to judge whether three or more of the odd vertices exist inside the outline of the multiple figure. If so, continuous cutting cannot be performed, because an auxiliary line (described later) must not be drawn inside the outline of the multiple figure. Therefore, the display unit 13 indicates "continuous cutting is impossible".

S-10: If it is determined in Step S-8 that three or more of the odd vertices do not exist inside the outline of the multiple figure, and more precisely, if the multiple figure has an even number of, 4 or more odd vertices and 3 or more of them do not exist inside the outline of the multiple figure, two external odd vertices will be selected under the following conditions in order to connect them. The multiple figure shown in FIG. 3 is categorized into this case, as it has four odd vertices a, b, c and f and the vertex f is positioned inside the outline of the multiple figure. Therefore, in the case of the multiple figure shown in FIG. 3, two odd vertices are selected from the odd vertices a, b and c positioned on the outline of the multiple figure under the following conditions and connected by an auxiliary line.

(1) First, the vertex, which is most unlikely to be the cutting start point, is selected. In this embodiment, the vertex most likely to be the cutting start point (this vertex is initially set) is the nearest to zero in the X-coordinate and the furthest from zero in the Y-coordinate, so that the odd vertex to be firstly selected is the furthest from zero in the Y-coordinate and the nearest to zero in the X-coordinate.

(2) Second, the vertices, between which the shortest auxiliary line can be drawn are selected.

(3) The vertices to be selected should be such that the absolute value of the angle between the auxiliary line to be drawn and the X-axis or Y-axis is small. In other words, the auxiliary line should be as parallel to the X-axis or Y-axis as possible.

In this way, the odd vertices b and c in the multiple figure shown in FIG. 3 are selected.

Figure 4:
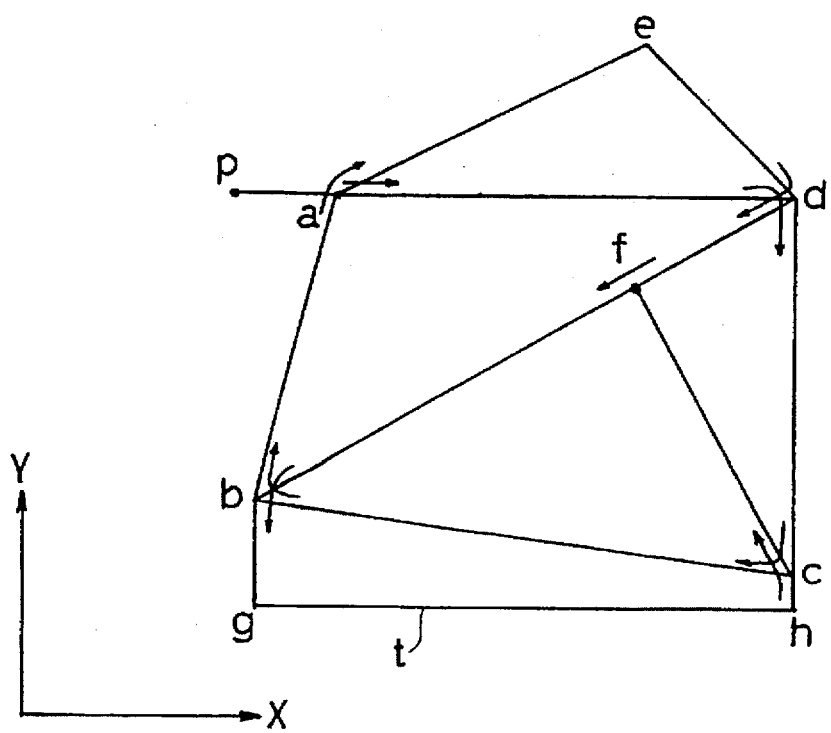

The two odd vertices thus selected are linked by an auxiliary line such that a preliminarily set distance is kept between the two odd vertices and the two turning points on the auxiliary line in the direction of the X-axis or Y-axis. This auxiliary line is positioned outside the outline of the multiple figure, running at the shortest distance between the two odd vertices. In the case of the multiple figure shown in FIG. 3, points g, h are so determined that distance is kept between these points g, h and the odd vertices b, c in the direction of the Y-axis, and the points g, h are linked by a straight line as shown in FIG. 4 so that an auxiliary line in the form of ] is formed outside the outline of the multiple figure.

S-11: A check is made to judge whether the number of odd vertices becomes two due to the provision of the auxiliary line. If not, the program returns to Step S-10 to draw another auxiliary line outside the outline of the multiple figure. This process is repeated until the number of odd vertices becomes two. In the case of the multiple figure shown in FIG. 3, the addition of the auxiliary line t allows the multiple figure to have two odd vertices a and f, as shown in FIG. 4.

S-12: If it is determined in Step S-4 that the multiple figure has two odd vertices, or if it is determined in Step S-11 that the number of odd vertices in the multiple figure having the auxiliary line is two, a cutting start point is determined so as to meet the following conditions.

(1) Odd vertices on the outline of the multiple figure including the auxiliary line have priority over odd vertices (i.e., inner odd vertices) positioned inside the outline of the multiple figure including the auxiliary line. The reason for this is that if an inner odd vertex is selected as the cutting start point, piercing cannot be performed at a point distant from the cutting start point so that piercing has to be undesirably carried out on the inner odd vertex.

(2) In cases where the multiple figure including the auxiliary line has two odd vertices on its outline or two odd vertices inside the outline, the odd vertex which is more likely to be the cutting start point (this vertex is initially set) is selected. In this embodiment, the odd vertex to be selected as the cutting point is nearer to zero in the X-coordinate and further from zero in the Y-coordinate.

In the multiple figure including the auxiliary line t and shown in FIG. 4, the odd vertex a is thus selected as the cutting start point, with the point P determined as the piercing point.

S-13: For start cutting, one line segment is selected from an odd number of line segments which meet at the odd vertex selected as the cutting start point. This selection is done according to the following order of priority (this order is initially set).

(1) Priority is given to line segments having a lead end which does not constitute an odd vertex of the multiple figure including the auxiliary line. These line segments should not be selected as a "cutting line segment" in previous selection.

(2) Priority is given to internal line segments, namely, line segments which do not constitute the outline of the multiple figure including the auxiliary line. This is because if all external line segments (i.e., line segments which constitute the outline of the multiple figure including the auxiliary line) are cut, the blank portion still having internal line segments therein will be separated from the sheet material, so that the internal line segments cannot be cut after the separation.

(3) Where the odd vertex has two or more internal line segments, the internal line segment whose angle to the X-axis has a smaller absolute value is selected.

In compliance with the above order, the line segment a-d is selected in the case of the multiple figure that includes the auxiliary line t as shown in FIG. 4.

S-14 to S-16: A check is made to judge whether the lead end of the selected line segment is the cutting end point. If so, a check is then made to judge whether there still exist line segments which have not been selected as a cutting line segment but meet at the cutting end point. If there are no such line segments, the display unit 13 indicates "the end of the program (END)".

S-17: It is determined in Step S-14 that the lead end of the selected line segment is not the cutting end point, or if it is determined in Step S-15 that there still exist unselected line segments, one line segment is selected as a cutting line segment according to the order of priority explained in Step S-13 from the remaining unselected line segments that meet at the vertex where the lead end of the selected line segment is positioned. Then, the program returns to Step S-14.

The cutting passage is thus determined. In the case of the multiple figure including the auxiliary line t and shown in FIG. 4, the cutting passage starts from the odd vertex a (i.e., cutting start point) and proceeds in the direction of arrows shown in FIG. 4, sequentially passing through the internal, external line segments and auxiliary line a-d, d-c, c-b, b-a, a-e, e-d, d-f, f-b, b-g, g-h, h-c and c-f.

S-18: If it is determined in Step S-5 that the multiple figure has not 3 or more odd vertices, and if no odd vertices exist in the multiple figure, one of the even vertices at each of which an even number of internal and external line segments meet will be selected as a cutting start point according to the following order of priority.

(1) Even vertices that constitute the outline of the multiple figure have priority over even vertices (inner even vertices) that are positioned inside the outline of the multiple figure for the same reason as noted earlier in the case of odd vertices. Specifically, if an inner even vertex is selected as the cutting start point, piercing cannot be performed at a point distant from the cutting start point so that the inner even vertex is undesirably set as the piercing point.

(2) In cases where the multiple figure has even vertices only on the outline or where it has even vertices only inside the outline, the even vertex which is more likely to be the cutting start point (this vertex is initially set) is selected, similarly to the case of odd vertices. In this embodiment, the even vertex more likely to be the cutting start point is nearer to zero in the X-coordinate and further from zero in the Y-coordinate.

Figure 5:
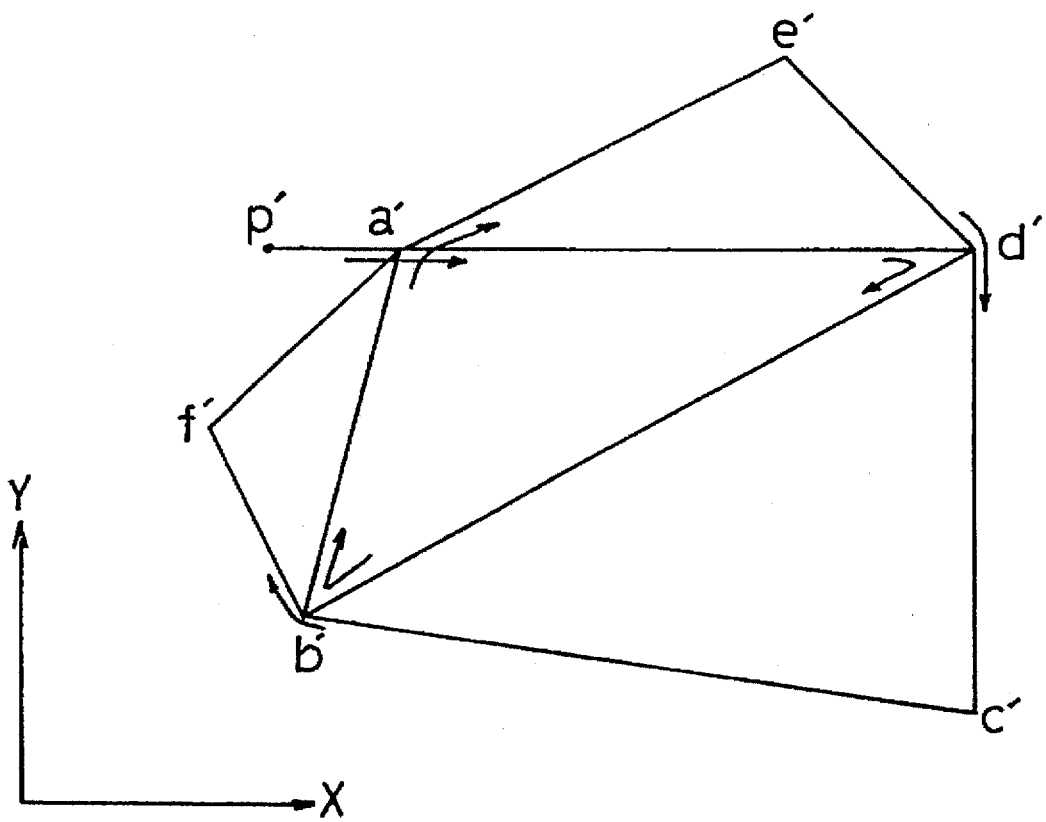

In the multiple figure shown in FIG. 5, the even vertex a' is accordingly selected as the cutting start point, with the point P' determined as the piercing point.

S-19: A cutting line segment is selected from the even number of line segments which meet at the selected even vertex, according to the same order of priority as described in Step S-13.

In this way, the line segment a'-d' is selected in the case of the multiple figure shown in FIG. 5.

S-20 to S-22: A check is made to judge whether the lead end of the selected line segment is the cutting start point. If so, a check is then made to judge whether there still exist line segments which have not been selected as a cutting line segment and which constitute the cutting start point. If there are no such line segments, the display unit 13 indicates "the end of the program (END)".

S-23: It is determined in Step S-20 that the lead end of the selected line segment is not the cutting start point, or if it is determined in Step S-21 that there still exist unselected line segments, one line segment is selected as a cutting line segment from the unselected line segments which meet at the even vertex that join the lead end of the selected line segment, according to the order of priority described in Step 19. Then, the program returns to Step S20.

In this way, the cutting passage is determined. In the case of the multiple figure shown in FIG. 5, the cutting passage starts from the even vertex a' (i.e., cutting start point) and proceeds in the direction of arrows shown in FIG. 5, sequentially passing through the internal and external line segments a'-d', d'-b', b'-a', a'-e', e'-d', d'-c', c'-b', b'-f' and f'-a'.

In the invention, not only steel plates but also non-ferrous sheet material such as Al and Ti and non-metal sheet material such as ceramics and plastics can be used as the sheet material.

While a laser cutter is used in the embodiment, a gas cutter, arc cutter, electron beam cutter, water jet cutter or the like may be used.

In the foregoing embodiment, the blank-figure constructing system of the invention is applied to a console-type computer in which both computer-aided design system and computer-aided manufacturing system are installed. However, it is also applicable to a console-type computer in which either computer-aided design system or computer-aided manufacturing system is installed. In addition, the computer is not limited to the console-type but other types may be employed.

Although the auxiliary line is drawn in the form of ] in the embodiment, it may alternatively assume the form of <. In other words, the auxiliary line may be angled and/or curved as far as it connects two selected odd vertices. The internal and external line segments constituting the multiple figure may be straight or curved.

In the embodiment, NC data is transferred from the console-type computer 10 to the numerical control unit 30, using a floppy disc as a medium. It is also possible to employ a communication line to transform it from the console computer 10 to the numerical control unit 30.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Industrial Applicability

It is understood from the foregoing description that, according to the invention, if the multiple figure has an even number of, four or more odd vertices, an auxiliary line is so drawn as to connect two odd vertices on the outline of the multiple figure, whereby a cutting passage that passes through all the internal and external line segments and auxiliary line of the multiple figure can be determined. This arrangement enables continuous cutting which leads to an increase in the speed of cutting operation. The method and system of the invention find a useful application particularly in the computer-aided design system and/or computer-aided manufacturing system.

I claim:

1. A blank-figure constructing method for sheet metal work wherein a cutting passage planned to sequentially cut a plurality of desired blanks from a sheet material is determined, utilizing a multiple figure composed of the figures of the plurality of blanks to be obtained, in the multiple figure of which the adjacent line segments of the single blank figures are combined, if the multiple figure has an even number of, four or more odd vertices at each of which an odd number of internal and external line segments of the multiple figure meet, an auxiliary line is drawn outside the multiple figure, connecting any two of the odd vertices on the outline of the multiple figure to make the total number of odd vertices be two or zero so that the cutting passage, which passes through all the internal, external line segments and auxiliary line of the multiple figure, can be determined.

2. The blank-figure constructing method for sheet metal work as claimed in claim 1, wherein said auxiliary line is angled and/or curved.

3. The blank-figure constructing method for sheet metal work as claimed in claim 1 or 2, which is applied to a computer-aided design system and/or a computer-aided manufacturing system.

4. The blank-figure constructing method for sheet metal work as claimed in claim 1 or 2, wherein said sheet material is a steel plate, non-ferrous sheet material or non-metal sheet material.

5. The blank-figure constructing method for sheet metal work as claimed in claim 1 or 2, wherein gas cutting, arc cutting, electron beam cutting, laser cutting or water jet cutting is performed to form the blanks.

6. A blank-figure constructing system for sheet metal work wherein a cutting passage planned to sequentially cut a plurality of desired blanks from a sheet material is determined, utilizing a multiple figure composed of the figures of the plurality of blanks to be obtained, in the multiple figure of which the adjacent line segments of the single blank figures are combined, comprising auxiliary line drawing means for drawing an auxiliary line outside the multiple figure, if the multiple figure has an even number of, four or more odd vertices at each of which an odd number of internal and external line segments of the multiple figure meet, to connect any two of the odd vertices on the outline of the multiple figure so that the total number of odd vertices becomes two or zero, wherein the cutting passage, which passes through all the internal, external line segments and auxiliary line of the multiple figure, is determined.

7. The blank-figure constructing system for sheet metal work as claimed in claim 6, wherein said auxiliary line is angled and/or curved.

8. The blank-figure constructing system for sheet metal work as claimed in claim 6 or 7, which is applied to a computer-aided design system and/or a computer-aided manufacturing system.

9. The blank-figure constructing system for sheet metal work as claimed in claim 6 or 7, wherein said sheet material is a steel plate, non-ferrous sheet material or non-metal sheet material.

10. The blank-figure constructing system for sheet metal work as claimed in claim 6 or 7, wherein gas cutting, arc cutting, electron beam cutting, laser cutting or water jet cutting is performed to form the blanks.

* * * * *